> 3,674,455
Patented July 4, 1972

3,674,455
PROCESS FOR THE SYNTHESIS OF GLASS AND SINGLE CRYSTAL GERMANATES OF IDENTICAL COMPOSITION
Cortland O. Dugger, Cambridge, Mass., assignor to the United States of America as represented by the Secretary of the Air Force
No Drawing. Filed July 31, 1970, Ser. No. 60,140
Int. Cl. C03c 3/22
U.S. Cl. 65—134   2 Claims

ABSTRACT OF THE DISCLOSURE

A process for forming germanate compositions from a starting mixture in which the concentration ratio limits of the oxygen ions to germanium ions is from 2.0:1 to 3.0:1; that is, $2.0:1 \leq O:Ge \leq 3.0:1$. The germanate compositions within the above limits include germanate glasses and germanate single crystals of identical composition. Specifically, the process involves the steps of intimately mixing appropriate quantities of sodium oxide and germanium oxide followed by the steps of heating the mixture to a temperature within the range of from about 1050° to 1525° C. with subsequent controlled cooling to room temperature.

BACKGROUND OF THE INVENTION

This invention relates to a method for growing high quality germanate glass and single crystalline materials of identical composition. More particularly, this invention concerns itself with a method for forming germanate glasses and single crystals from a starting component mixture in which the oxygen to germanium concentration ratio limits are $2.0:1 \leq O:Ge \leq 3.0:1$.

With this invention it has been found that well-formed germanate glasses and single crystals of the same chemical composition can be produced by heating and cooling a reactant mixture comprised of germanium oxide as a first component and sodium oxide as a second component.

SUMMARY OF THE INVENTION

In accordance with this invention it has been found that germanate glasses and single crystalline materials of identical composition can be formed from a starting mixture in which germanium oxide is one of the starting components and the ratio of oxygen ions to germanium ions is in the range of from $2.0:1 \leq O:Ge \leq 3.0:1$. The other component of the starting mixture is sodium oxide. Halides, sulfides, nitrides, borides and carbides may be included in the germanate but the concentration ratio of oxygen ions to germanium ions must be maintained at 2.0:1 to 3.0:1.

Formation of the germanates of this invention is effected by heating the starting mixture at a temperature and for a period of time sufficient to form a molten homogeneous solution or melt of the mixture's components followed by a controlled cooling of the molten solution or melt to room temperature.

Accordingly the primary object of this invention is to provide a method for synthesizing germanate glasses and single crystals in which the glasses and the single crystals consist of the same constituents and the same or nearly the same molar concentrations.

Another object of this invention is to provide a method for the synthesis of germanate compositions from a starting mixture in which the concentration ratio limits of the oxygen ions to germanium ions is the range of from 2.0:1 to 3.0:1.

A further object of this invention is to provide a method for synthesizing germanate glasses and single crystalline materials that are mechanically sound, substantially free from defects and possess the necessary overall quality that permits their use as laser materials.

Still further objects and advantages of the present invention will become readily apparent upon consideration of the following detailed description thereof.

DETAILED DESCRIPTION OF THE PREFERRED EMBODIMENT

In the method of this invention, the synthesis of germanate glasses and single crystals of identical composition is accomplished by heating a starting reactant mixture in which germanium oxide is one of the reactant components and the concentration ratio of oxygen ions to germanium ions is limited within the range of from two to three oxygen ions to one germanium ion; that is, $2.0:1 \leq O:Ge \leq 3.0:1$. These ratios, in the starting mixture, are the ion concentration limits for the germanate systems of this invention. However, it has been found that starting mixture oxygen to germanium ion concentration limits of from $2.0:1 \leq O:Ge \leq 2.3:1$ are preferable. Ingredient amounts in the range of 80 to 90 mole percent of germanium dioxide and 10 to 20 mole percent of sodium oxide provide the necessary ion concentration limits.

Identical composition in this invention is understood to mean that germanate glasses and single crystals consist of the same constituents and the molar concentration of the single crystal constituents and the constituents of one of the major phases of the glass are the same.

Examples of germanate systems which demonstrate the oxygen to germanium ion concentration ratios of this invention are found in Table I as follows:

TABLE

| Binary system | | Multi-component system | |
|---|---|---|---|
| Composition | O.Ge ratio | Composition | O.Ge ratio |
| $Na_4Ge_9O_{20}$ | 2.2:1 | $Na_2ZnGe_9O_{20}$ | 2.2:1 |
| $Na_2GeO_3$ | 3.0:1 | $Na_2Al_2Ge_4O_{11}$ | 3.0:1 |

Generally, in carrying out the method of the invention, appropriate amounts of germanium oxide and sodium oxide are intimately mixed. The mixture is then heated to a temperature and maintained at that temperature for a time sufficient to form a homogeneous, molten solution or melt. The molten solution or melt is then cooled at a programmed rate to room temperature.

Maximum soak temperatures (maintained high temperatures to insure solution and homogeneity, etc.) can vary from 1050° C. to 1525° C. depending upon the length of soak temperature time periods and the liquidus temperature of the germanate being synthesized. Similarly, the cooling rates can also vary depending upon the type of glass desired and the germanate system being synthesized. Stirring the molten salt, for example $Na_4Ge_9O_{20}$, within the temperature range of 1100° C. to 1500° C. for one hour, appears to enhance better optical quality glasses. This is generally performed following a soak temperature time interval of one hour.

The maximum soak temperature to which the mixture is heated to insure complete solution and chemical homogeneity of the constituents in the mixture as well as the removal of bubbles and the dissolution of crystalline nuclei, is generally well above the melting temperature of the mixture. The maximum soak temperature can be as high as 1525° C. which is above the melting temperature. In the case of $Na_4Ge_9O_{20}$ the melting temperature is a ca. 1070° C., an increase of 330° C. Also, the method of the invention can be carried out in atmospheres other than air; e.g., reducing, oxygen, and inert. Atmospheres other than air or oxygen appear to enhance better optical quality glasses.

In this invention, a "starting mixture" is considered to be the result of the mechanical mixing together of the highest purity available of desired constituents to produce, at least theoretically, an electrically charge-balance (stoichiometric) chemical compound, e.g., two (2) moles of sodium oxide ($Na_2O$) mixed with nine (9) moles of germanium dioxide ($GeO_2$) to give one (1) mole of sodium neogermanate ($Na_4Ge_9O_{20}$). In $Na_4Ge_9O_{20}$, the sodium ion has a total plus charge of four (4), the germanium ion has a total plus charge of thirty-six (36), and the oxygen has a total negative charge of forty (40) so that $Na_4Ge_9O_{20}$ is theoretically a "stoichiometric" compound. A germanate system is considered in this invention to be a system in which germanium dioxide or germanium monoxide is in chemical combination with one or more metal oxides within the temperature range from 4.2° K. to 4273° K. Halides, sulfides, nitrides, borides, and carbides may be included in the germanates, but the concentration O.Ge ratio limits of 2.0:1 to 3.0:1 in the starting mixture must be maintained.

The common denominator for each germanate system within the starting mixture of the oxygen to germanium concentration ratio limits of 2.0:1 to 3.0:1 is the presence of open structures. These open structures are particularly evidenced within the limits of $2.0:1 \leq O:Ge \leq 2.3:1$. The open structures enable the host matrix, e.g., $Na_4Ge_9O_{20}$, to be either unidoped or multiple-doped by most non-transition oxide or transition oxide dopants, including the rare earth oxides. The intentional addition of impurities (dopants) in the host matrix enables variations in the properties of the host matrix to be made. Optical, electrical, magnetic and mechanical properties of the host matrix can be altered by the addition or inclusion of dopants.

Open structures are present in $Na_4Ge_9O_{20}$, as well as in other germanates whose starting mixture oxygen to germanium concentration ratio limits are $$2.0:1 \leq O:Ge \leq 3.0:1$$

In the case of $Na_4Ge_9O_{20}$, cations larger than the ionic radii of $Na^{+1}$ and $Ge^{+4}$ can fit comfortably into these open structures without intentional charge compensation because the cations are added as cationic oxides, e.g., $Nd_2O_3$. The cationic oxide ($Nd_2O_3$) is already electrically neutral and appears to chemically combine to $Na_4Ge_9O_{20}$ by fitting into the open structures. A significantly better understanding of the "role" of dopants in glasses and single crystals in identical laser host matrices can be made. The "role" would be crystal-field-like effects in glasses which should be similar to the crystal field effects in single crystals. This is possible because the short range atomic order of glasses is similar to the long range atomic order of single crystals.

The invention finds great utility because of the number of applications for germanate systems. One such application for germanates is their lasing capability. With this invention, both glass and single crystals of the same germanate composition and dopant concentration can be synthesized. The two different kinds of solid state lasers (glass and crystal) of the same germanate host matrix composition and dopant concentration, which have never been synthesized before, can laser complement and/or supplement each other.

Specific embodiments to illustrate the invention are found in the following examples. The synthesis of glass and sodium neogermanate ($Na_4Ge_9O_{20}$), is shown in Example 1 while the synthesis of single crystal sodium neogermanate is shown in Example 2. Process variations occur for each germanate system, therefore the specific embodiment for $Na_4Ge_9O_{20}$ is intended to be illustrative only rather than in any way defining the limits of the invention. A glass, in this invention, is understood to be either a super-cooled-liquid or a true glass; glasses are mixtures or solutions rather than exact chemical compounds.

EXAMPLE 1

Appropriate quantities of the previously dried starting constituents consisting of two moles of sodium oxide ($Na_2O$) and nine moles of germanium dioxide (9 $GeO_2$) are intimately mixed and placed in a 90 ml. platinum crucible. The crucible and mixture are heated from 1400° C. to 1500° C. and maintained within this temperature range for two hours in air. This temperature range insures: (a) the complete solution and chemical homogeneity of the oxides, (b) the complete removal of bubbles, and (c) the complete destroying (dissolution) of crystalline nuclei. The platinum crucible is removed from the furnace and the molten salt is either air quenched to ca. 1050° C. and then water quenched to approximately 670° C., or super-cooled to 900° C. The quenched glass in the platinum crucible is placed in a second furnace which has been preheated to 670° C., or, if super-cooled, the glass is quickly water-quenched from 900° C. to 670° C. and placed in a preheated (670° C.) furnace. In either case, the furnace is program-cooled from 670° C. to 550° C. at 10° C./hr. The glass is then program-cooled 30° C./hr. from 550° C. to room temperature. The annealed glass is removed from the crucible.

If a portion of the glass from Example 1 is heated to 650° C. it devitrifies and forms a polycrystalline material of the same composition. X-ray analysis of the polycrystalline material detects the major phase to be $Na_4Ge_9O_{20}$. An abbreviated glass synthesis procedure which is used to prepare $Na_4Ge_9O_{20}$ is to heat the starting mixture to the maximum soak temperature (1450° C.) in air, hold for one hour and rapidly quench, in air, to room temperature. At room temperature, the fused salt is of a glass and polycrystalline mixture.

EXAMPLE 2

A mixture of previously dried constituents consisting of two moles of sodium oxide and nine moles of germanium dioxide are placed in a 90 ml. platinum crucible and heated to a temperature from 1400 to 1500° C. and maintained within this temperature range for one to two hours in air. The platinum crucible is removed from the furnace and transferred to a preheated (1080° C.) resistant wound furnace. After temperature equilibration, the end of an oriented $Na_4Ge_9O_{20}$ single crystal seed is immersed just below the surface of the melt. The temperature is raised five degrees (5° C.) to 1085° C. The seed crystal is rotated (20 to 100 r.p.m.) and a slow withdrawal (0.05" to 0.125" per hour) of the seed crystal is initiated. After the desired length of crystal is grown, the furnace is program-cooled (50° C./hr.) to room temperature.

The use of this invention makes available a family of germanate materials which can be used in various electromagnetic applications. Some of the germanate systems are laser and could serve in defense applications such as antimissile devices, space navigation and communication systems, and moon mapping and alignment instrumentation. Other applications for these materials can be found in their use as temperature and radiation detectors, luminescent display devices, photosensitive glasses, ferroelectrics, devices which employ electro-luminescent and cathodo-luminescence, and as laser pumping sources.

While the invention is described with reference to a specific embodiment, it is to be expressly understood, particularly by those skilled in the art of synthesizing materials, that many variations in the synthesis of the glasses and polycrystalline germanate materials of this invention may be made in form and detail without departing from the spirit and scope of the invention as defined by the appended claims.

What is claimed is:

1. A method for synthesizing a germanate glass comprising the steps of (a) providing a mixture comprising about 81.8 mole percent germanium oxide and about 18.2 mole percent sodium oxide such that the concentration ratio of oxygen ions to germanium ions is within the range of 2.0:1 to 3.0:1, (b) heating said mixture to a temperature between about 1400° and 1500° C., (c) maintaining said mixture at said temperature for about two hours to form a homogeneous molten material thereof and (d) cooling said molten material at a controlled rate such that the heated mixture is air-cooled rapidly to a temperature of about 1050° C., water-cooled rapidly to a temperature of about 670° C., cooled to a temperature of about 500° C. at a programmed rate of about 10° C. per hour, and then cooled to room temperature at a programmed rate of about 30° C. per hour.

2. A method in accordance with claim 1 wherein said controlled cooling is effected by air cooling rapidly to a temperature of about 1050° C., supercooling to a temperature of about 900° C., water-cooling rapidly to 670° C., cooling to a temperature of about 500° C. at a programmed rate of about 10° C. per hour, and then cooling to room temperature at a programmed rate of about 30° C. per hour.

References Cited

UNITED STATES PATENTS

| | | | |
|---|---|---|---|
| 3,531,305 | 9/1970 | Dumbaugh, Jr. | 65—134 X |
| 3,477,959 | 11/1969 | Colton | 23—301 X |

OTHER REFERENCES

Corning Research 1963, pp. 19–25, "Structure of Molten Oxides I" by E. F. Riebling, May 20, 1963; copy in group 173, Glass Library Journal of Applied Physics, vol. 36, No. 3, August 1965, "Crystal Growth & Electro-Optical Effect of Bi-Germanate," by R. Nitsche, pp. 2358–2360.

ARTHUR D. KELLOGG, Primary Examiner

U.S. Cl. X.R.

23—273, 301, 305; 106—47 Q, 47 R